United States Patent
Wymore (10) Patent No.: US 10,272,861 B2
(45) Date of Patent: Apr. 30, 2019

(54) VEHICLE FRONT BUMPER WITH LOCKABLE STORAGE DRAWER

(71) Applicant: Iddea California, LLC, Brea, CA (US)

(72) Inventor: Timothy J. Wymore, Yorba Linda, CA (US)

(73) Assignee: Iddea California, LLC, Brea, CA (US)

( * ) Notice: Subject to any disclaimer, the term of this patent is extended or adjusted under 35 U.S.C. 154(b) by 0 days.

(21) Appl. No.: 15/266,153

(22) Filed: Sep. 15, 2016

(65) Prior Publication Data

US 2018/0072254 A1   Mar. 15, 2018

(51) Int. Cl.
| | |
|---|---|
| *B60R 19/48* | (2006.01) |
| *B60R 11/06* | (2006.01) |
| *B60R 9/06* | (2006.01) |
| *B60R 11/00* | (2006.01) |

(52) U.S. Cl.
CPC .............. *B60R 19/48* (2013.01); *B60R 9/065* (2013.01); *B60R 11/06* (2013.01); *B60R 2011/004* (2013.01); *B60R 2011/0096* (2013.01)

(58) Field of Classification Search
CPC ......... B60R 19/48; B60R 11/06; B60R 19/34; B60R 9/065; B60R 19/023; B60R 19/18; B60R 19/24; B60R 19/52
USPC .... 293/106, 117, 1, 115, 118, 142; 224/402, 224/510, 552, 554, 404
See application file for complete search history.

(56) References Cited

U.S. PATENT DOCUMENTS

| | | | |
|---|---|---|---|
| 3,243,247 A | 3/1966 | Knape | |
| 3,471,070 A | 10/1969 | Olson | |
| 3,501,170 A | 3/1970 | Valle | |
| 3,606,385 A | 9/1971 | Johannes | |
| 3,614,136 A | 10/1971 | Dent et al. | |
| 3,682,360 A * | 8/1972 | Fletcher | B60R 19/48 224/402 |
| 4,138,152 A | 2/1979 | Prue | |
| 4,570,986 A | 2/1986 | Sams | |
| 4,674,782 A | 6/1987 | Helber | |

(Continued)

FOREIGN PATENT DOCUMENTS

KR    1993-0006524    9/1993

OTHER PUBLICATIONS

Go Rhino, Go Rhino BRJ40 Front Bumper for Jeep Wrangler JK Installation, Retrieved on the Internet on [Sep. 16, 2017] <URL: https://www.youtube.com/watch?v=wH6aVLnf9WY>, Jun. 29, 2016.

(Continued)

*Primary Examiner* — D Glenn Dayoan
*Assistant Examiner* — Sunsurraye Westbrook
(74) *Attorney, Agent, or Firm* — Stetina Brunda Garred and Brucker (57) ABSTRACT

A vehicle front bumper includes a bumper member and a lockable drawer slideably coupled to the bumper member. The bumper member includes a middle portion including a coupled between two or more lateral portions. The middle portion of the bumper member includes a receptacle. The drawer includes a bottom wall and a perimeter of walls extending upwardly therefrom and defining a storage compartment therein. The lockable drawer is slideably moveable from a closed position, in which the storage compartment is disposed within the receptacle, to an open position, in which at least a portion of the storage compartment is disposed outward from a front end of the vehicle front bumper.

17 Claims, 4 Drawing Sheets

(56) References Cited

U.S. PATENT DOCUMENTS

| | | | |
|---|---|---|---|
| 4,676,415 A | | 6/1987 | Kennedy |
| 4,893,856 A | * | 1/1990 | Council .................. B60D 1/06 |
| | | | 293/106 |
| 5,016,932 A | | 5/1991 | Carter |
| 5,135,274 A | | 8/1992 | Dodd |
| 5,364,142 A | | 11/1994 | Coiner |
| 5,823,585 A | | 10/1998 | Tanguay |
| 5,979,953 A | * | 11/1999 | Rinehart ................. B60R 19/48 |
| | | | 293/106 |
| 6,149,181 A | * | 11/2000 | Biederman ............ B60D 1/485 |
| | | | 280/491.1 |
| 8,011,704 B2 | | 9/2011 | Nees et al. |
| 8,602,467 B2 | * | 12/2013 | Lee ........................ B60R 19/48 |
| | | | 293/106 |
| 8,857,684 B1 | | 10/2014 | Calvert |
| 2016/0121832 A1 | | 5/2016 | Hare |
| 2016/0144815 A1 | | 5/2016 | Harris et al. |
| 2016/0221520 A1 | | 8/2016 | Subramanian |

OTHER PUBLICATIONS

International Searching Authority, International Search Report and Written Opinion for International Application No. PCT/US2017/043490, dated Sep. 27, 2017, 9 pages.

* cited by examiner

VEHICLE FRONT BUMPER WITH LOCKABLE STORAGE DRAWER

CROSS-REFERENCE TO RELATED APPLICATIONS

Not Applicable

STATEMENT RE: FEDERALLY SPONSORED RESEARCH/DEVELOPMENT

Not Applicable

BACKGROUND

Technical Field

The present disclosure relates to bumpers for motor vehicles. More particularly, the present disclosure relates to a front bumper with a lockable storage drawer for a motor vehicle, such as a truck, recreational vehicle or sports utility vehicle.

Discussion of Related Art

A motor vehicle may be equipped with a bumper on both the front and rear of the vehicle. The purpose of bumpers for motor vehicles is to provide protection against damage to the vehicle and injury to vehicle occupants during impacts, to provide a finished "dress" appearance, and in some cases to be used for towing purposes. Most vehicle bumpers incorporate basic structural components for function, e.g., absorbing impact experienced at either end of the vehicle during a collision, and also trim components for aesthetics.

Bumpers for the front or rear ends of a motor vehicle typically include a bumper beam to provide protection against damage in case of a collision involving the motor vehicle. Typically, the bumper beams at the front and rear ends of a motor vehicle body extend transversely with respect to the longitudinal axis of the motor vehicle body. The bumper beams are typically secured to a pair of rails which connect the bumper beams to the motor vehicle body. The bumper beams are commonly connected to the rails by end brackets. A bumper cover may be mounted or fixedly secured to the bumper/bumper beam, and provides a structural form to the vehicle while absorbing impact force during a collision. The bumper cover may be arranged on a front or rear of a vehicle body so as to extend in the vehicle width direction.

Utility boxes or wells for securing parts, tools or other equipment are commonly associated with trucks. As one example, utility boxes are commonly secured in pickup truck beds at the front of the pickup bed adjacent the truck cab rear wall. Utility or storage boxes have also been incorporated into truck rear bumpers to serve as a storage container for tools, etc.

It is known to provide a vehicle with a tool box-bumper combination, i.e., a tool box having the general form of a vehicle bumper and adapted to be mounted across the rear end of a truck in the usual position of the bumper. Storage box (or "tool box") bumpers contain an enclosed compartment with a top portion or lid, usually with a hinge to the rear, which can be lifted up to expose the storage area within the rear bumper. Examples of storage box bumpers having an interior storage section or sections that may be enclosed by a lid are described by U.S. Pat. Nos. 3,471,070, 3,501,170, 3,606,385, 3,614,136, 4,138,152, 4,570,986, and 4,674,782. The units described tend to be larger than a conventional bumper, and tend not be particularly pleasing aesthetically. It is also known to provide the rear end of a vehicle with a storage drawer which is positioned forwardly of a rear bumper. U.S. Pat. No. 3,682,360 discloses a drawer that is attached to the rear bumper and extends forwardly from the rear bumper. The rear bumper forms the rear end of the drawer. The entire rear bumper is movable with the drawer, rearwardly to open the drawer and forwardly to close the drawer. U.S. Pat. No. 4,676,415 discloses a storage drawer which extends forwardly of a lower central portion of a rear bumper. The central portion of the rear bumper moves with the drawer during opening and closing of the drawer.

A need exists for improved storage systems for sports utility vehicles, trucks, and other vehicles. There is a need for a way to carry gear, emergency equipment, tools and/or accessories in an out-of-the-way but readily accessible, theft-proof manner.

BRIEF SUMMARY

According to an aspect of the present disclosure, a vehicle front bumper includes a bumper member and a lockable drawer slideably coupled to the bumper member. The bumper member includes a middle portion coupled between two or more lateral portions. The middle portion of the bumper member includes a receptacle. The lockable drawer includes a bottom wall and a perimeter of walls extending upwardly therefrom and defining a storage compartment therein. The lockable drawer is slideably moveable from a closed position, in which the storage compartment is disposed within the receptacle, to an open position, in which at least a portion of the storage compartment is disposed outward from a front end of the vehicle front bumper.

The perimeter of walls may include a front wall, a rear wall, a first side wall, and a second side wall. The front wall may include a first portion and a second portion. The first portion and the second portion of the front wall may be integrally formed as a single unitary body.

The middle portion of the bumper member may include a front middle portion surface, a first angled middle portion surface, a second angled middle portion surface, and a top middle portion surface. An upper edge of the first angled middle portion surface may be situated adjacent to a forward edge of the top middle portion surface, and a lower edge of the first angled middle portion surface may be situated adjacent to an upper edge of the front middle portion surface. An upper edge of the second angled middle portion surface may be situated adjacent to a lower edge of front middle portion surface.

When in the closed position, the first portion of the front wall of the lockable drawer may be substantially flush with the front middle portion surface of the middle portion of the bumper member, and the second portion of the front wall of the lockable drawer may be substantially flush with the second angled middle portion surface of the bumper member.

According to another aspect of the present disclosure, a vehicle front bumper includes a lockable drawer slideably coupled to a bumper member. The bumper member includes a receptacle having an outer perimeter. A first portion of the bumper member includes a front surface coupled between a first angled surface and a second angled surface. The outer perimeter of the receptacle includes an upper outer perimeter portion, which is defined by the front surface of the first portion of the bumper member, and a lower outer perimeter portion, which is defined by the second angled surface of the first portion of the bumper member. The lockable drawer is slideably moveable from a closed position, in which the storage compartment is disposed within the receptacle, to an open position, in which at least a portion of the storage compartment is disposed outward from a front end of the vehicle front bumper.

BRIEF DESCRIPTION OF THE DRAWINGS

These and other features and advantages of the various front bumper with lockable storage drawer embodiments disclosed herein will be better understood with respect to the following description and drawings, in which like reference numerals may refer to similar or identical elements throughout the description of the figures, and in which.

DETAILED DESCRIPTION

Hereinafter, embodiments of a front bumper with a lockable storage drawer are described with reference to the accompanying drawings.

This description may use the phrases "in an embodiment," "in embodiments," "in some embodiments," or "in other embodiments," which may each refer to one or more of the same or different embodiments in accordance with the present disclosure.

It is to be understood that the terminology used herein is for the purpose of describing particular embodiments only, and is not intended to be limiting. As used herein, the term "truck" generally refers to land-based motor vehicles with an open rear cargo box often referred to as a "pickup truck," "pickup" or "pick-up". The open rear cargo box is often referred to as the "bed" of the truck. As used herein, the term "sports utility vehicle" or "SUV" generally refers to vehicles designed for use on rough terrain and/or off road.

Various embodiments of the present disclosure provide a front bumper with a lockable storage drawer for various uses. Embodiments of the presently-disclosed front bumper with a lockable storage drawer may be affixed to sports utility vehicles (SUVs), trucks, or other vehicles. Embodiments of the presently-disclosed front bumper may include a single storage drawer, or a plurality of storage drawers, e.g., positioned laterally adjacent one another to provide a series of separate storage areas. Embodiments of the presently-disclosed lockable storage drawer may include one or more compartments for receiving various items. Heavy items can be stored in the presently-disclosed lockable storage drawer to affect the weight distribution of the vehicle, e.g., in order to provide maximum traction.

Embodiments of the presently-disclosed front bumper with a lockable storage drawer may provide cost effective ways to achieve significant vehicle differentiation and brand recognition while providing useful features to the vehicle user.

Figure 1:
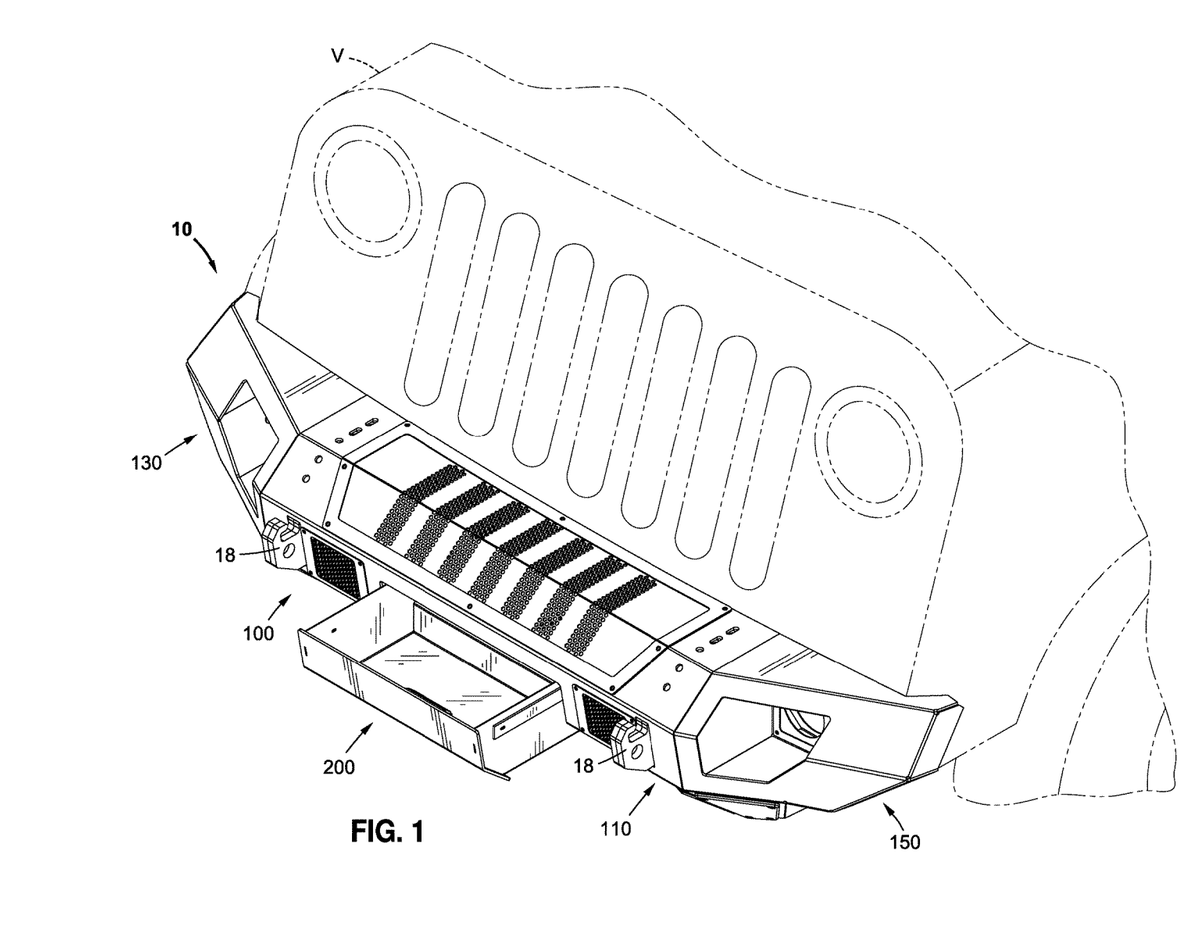
FIG. 1 is a perspective view illustrating a front bumper with a lockable storage drawer installed on the front end of a vehicle in accordance with an embodiment of the present disclosure.

In FIGS. 1-6, an embodiment of a front bumper with a lockable storage drawer (generally referred to herein as "bumper assembly 10") is shown for use with a motor vehicle, e.g., a sports utility vehicle or a truck. Various parts of the bumper assembly 10 may be formed of any of a variety of materials, including non-metallic and/or metallic materials. In FIG. 1, bumper assembly 10 is shown installed on a vehicle V. It is to be understood that the bumper assembly 10 may be installed and used on various types of vehicles and should not be construed to be limited to only sports utility vehicles or trucks.

The bumper assembly 10 generally includes a bumper member 100 and a storage drawer 200 slideably coupled to the bumper member 100. The bumper member 100 includes a first portion 110 (also referred to herein as "middle portion 110") and at least two lateral portions. Tow hooks 18 may be mounted to the bumper member 100, or recessed into a wall of the middle portion 110 thereof, as an optional accessory. Those skilled in the art will recognize that the size and shape of the bumper member 10 may vary according to vehicle model, manufacturer, style of vehicle, etc.

In some embodiments, as shown for example in FIGS. 1-5, the bumper member 100 includes a middle portion 110, a first lateral portion 130, and a second lateral portion 150. The middle portion 110, the first lateral portion 130 and the second lateral portion 150 have an aerodynamic appearance that minimizes surface profile, e.g., to increase vehicle clearance and/or to prevent or minimize the possibility that the bumper assembly 10 will "hang-up" in rough terrain.

In an embodiment, the middle portion 110 of the bumper member 100 includes a front middle portion surface 111, a first angled middle portion surface 112, a second angled middle portion surface 113, and a top middle portion surface 114. An upper edge of the first angled middle portion surface 112 is situated adjacent to a forward edge of the top middle portion surface 114, and a lower edge of the first angled middle portion surface 112 is situated adjacent to an upper edge of the front middle portion surface 111. An upper edge of the second angled middle portion surface 113 is situated adjacent to a lower edge of front middle portion surface 111. In an embodiment, the first angled middle portion surface 112 is angled upward relative to a horizontal plane (e.g., a horizontal plane parallel to a road or a truck bed), and the second angled middle portion surface 113 is angled downward relative to a horizontal plane (e.g., a horizontal plane extending through the vehicle rear axle and front axle).

The bumper member 100 may include one or more step plates associated therewith. In an embodiment, the middle portion 110 of the bumper member 100 includes a step plate 60. The step plate 60 may include a first step plate portion 62, which is associated with the first angled middle portion surface 112 of the middle portion 110, and a second step plate portion 64, which is associated with the top middle portion surface 114. The step plate 60 may be provided with anti-slip features (e.g., strips, ribs, non-skid texture coating, etc.) to provide an anti-slip surface.

In some embodiments, the first lateral portion 130 of the bumper member 100 includes a first upwardly angled lateral portion surface 132, a first downwardly angled lateral portion surface 131, and a first top lateral portion surface 134.

In an embodiment, an upper edge of the first upwardly angled lateral portion surface 132 is situated adjacent to a forward edge of the first top lateral portion surface 134, and a lower edge of the first upwardly angled lateral portion surface 132 is situated adjacent to an upper edge of the first downwardly angled lateral portion surface 131. In an embodiment, the first downwardly angled lateral portion surface 131 and the first upwardly angled lateral portion surface 132 are integrally formed as a single unitary body. The first lateral portion 130 may include a first lateral portion recess 43, e.g., for housing a lamp and/or fixture for the lamp.

In some embodiments, the second lateral portion 150 of the bumper member 100 includes a second upwardly angled lateral portion surface 152, a second downwardly angled lateral portion surface 151, and a second top lateral portion surface 154. In an embodiment, an upper edge of the second upwardly angled lateral portion surface 152 is situated adjacent to a forward edge of the second top lateral portion surface 154, and a lower edge of the second upwardly angled lateral portion surface 152 is situated adjacent to an upper edge of the second downwardly angled lateral portion surface 151. In an embodiment, the second downwardly angled lateral portion surface 151 and the second upwardly angled lateral portion surface 152 are integrally formed as a single unitary body. The second lateral portion 150 may include a second lateral portion recess 45, e.g., for housing a lamp and/or fixture for the lamp.

In an embodiment, the first lateral portion 130 of the bumper member 100 may include a first upper-end lateral portion surface 133 having a forward edge situated adjacent to an outer-end edge of the first upwardly angled lateral portion surface 132, and the second lateral portion 150 of the bumper member 100 may include a second upper-end lateral portion surface 153 having a forward edge situated adjacent to an outer-end edge of the second upwardly angled lateral portion surface 152. The first lateral portion 130 may additionally, or alternatively, include a first lower-end lateral portion surface 136 having a forward edge situated adjacent to an outer-end edge of the first downwardly angled lateral portion surface 131. The second lateral portion 150 may additionally, or alternatively, include a second lower-end lateral portion surface 156 having a forward edge situated adjacent to an outer-end edge of the second downwardly angled lateral portion surface 151.

Figure 2:
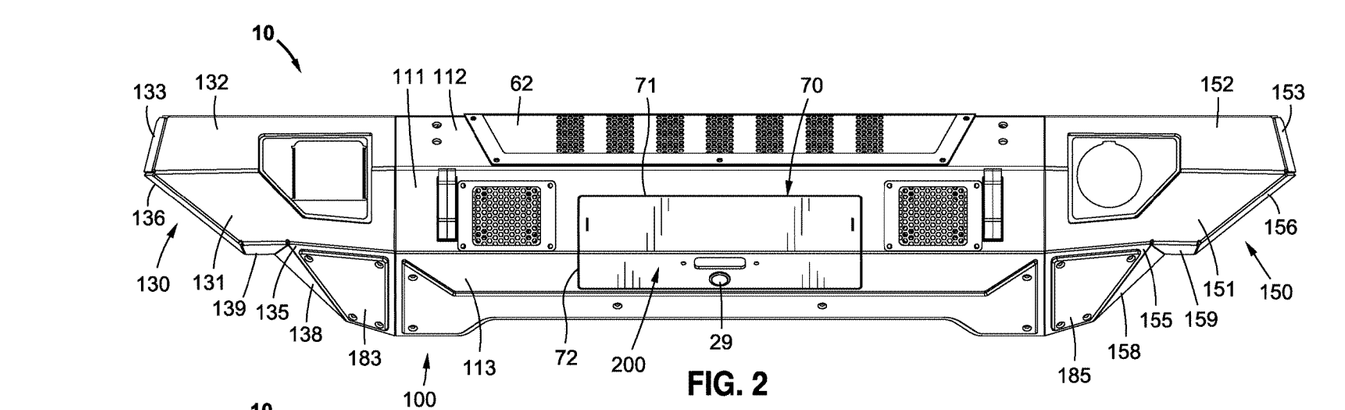
FIG. 2 is a front perspective view of the front bumper assembly of FIG. 1 in accordance with an embodiment the present disclosure.
Figure 3:
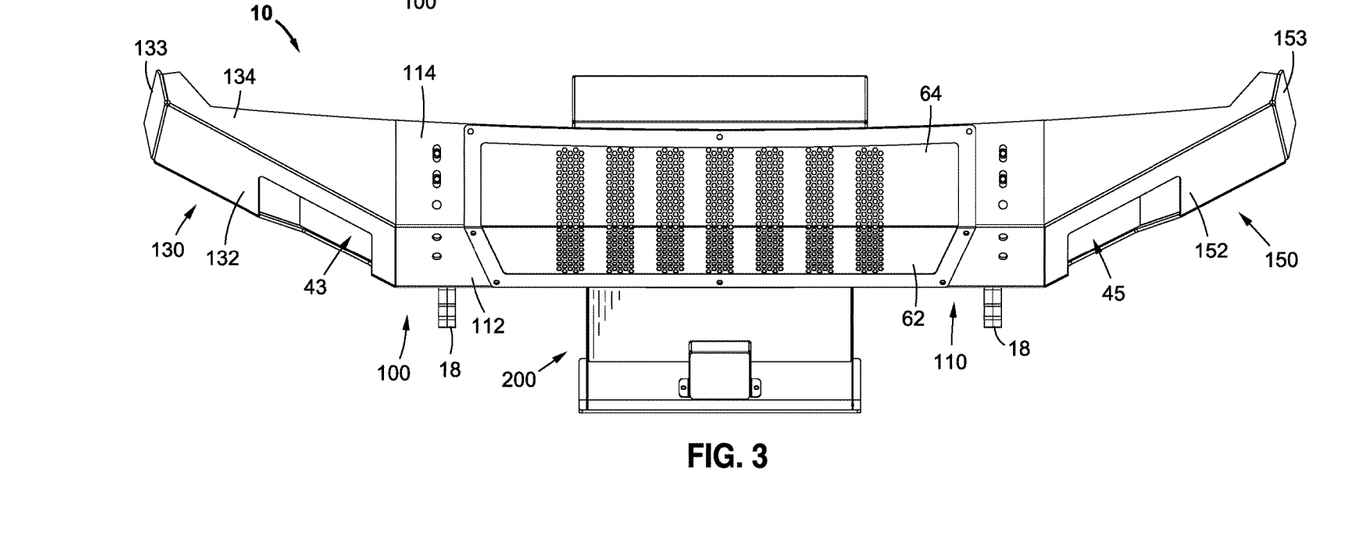
FIG. 3 is a top perspective view of the front bumper assembly of FIG. 1 in accordance with an embodiment the present disclosure.
Figure 5:
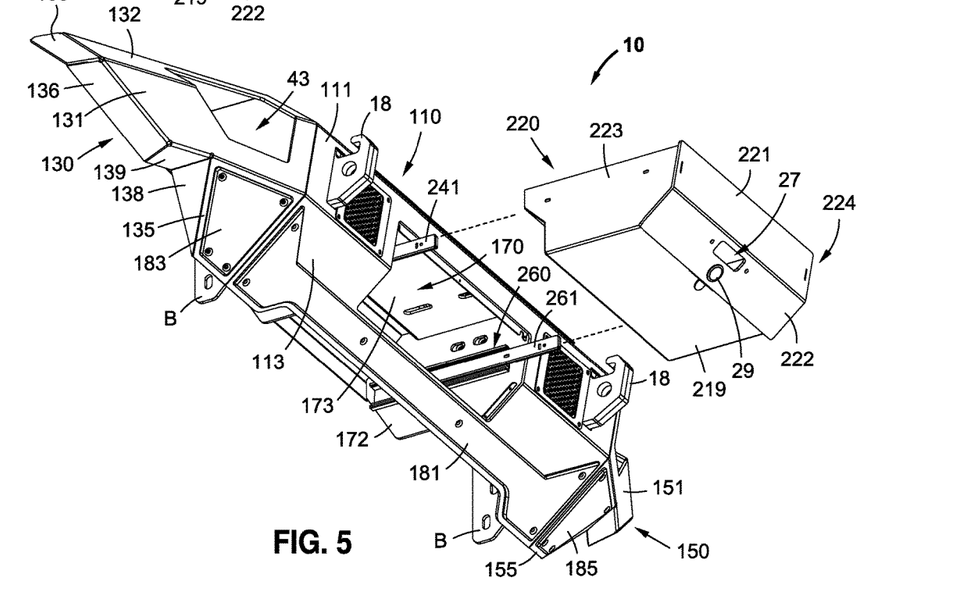
FIG. 5 is a perspective view of the front bumper assembly of FIG. 1, with parts separated, in accordance with an embodiment the present disclosure.

In some embodiments, as shown for example in FIGS. 2 and 5, the first lateral portion 130 includes a first lower lateral portion surface 135 having an upper edge thereof situated adjacent to a lower edge of the first downwardly angled lateral portion surface 131, and the second lateral portion 150 includes a second lower lateral portion surface 155 having an upper edge thereof situated adjacent to a lower edge of the second downwardly angled lateral portion surface 151. In an embodiment, the first downwardly angled lateral portion surface 131, the first upwardly angled lateral portion surface 132, and the first lower lateral portion surface 135 are integrally formed as a single unitary body. In an embodiment, the second downwardly angled lateral portion surface 151, the second upwardly angled lateral portion surface 152, and the second lower lateral portion surface 155 are integrally formed as a single unitary body.

In some embodiments, the bumper assembly 10 may include one or more skid plates to help prevent wear and tear in the vehicle's front end and/or improve the vehicle's appearance The first lower lateral portion surface 135 of the first lateral portion 130 of the bumper assembly 10 may be provided with a first skid plate 183. The second angled middle portion surface 113 of the middle portion 110 of the bumper assembly 10 may be provided with a second skid plate 181. The second lower lateral portion surface 155 of the bumper assembly 10 may be provided with a third skid plate 185.

The first lateral portion 130 may include a first bottom lateral portion surface 139 having a forward edge situated adjacent to a forward edge of the first downwardly angled lateral portion surface 131, and the second lateral portion 150 may include a second bottom lateral portion surface 159 having a forward edge situated adjacent to a forward edge of the second downwardly angled lateral portion surface 151. The first lateral portion 130 may additionally, or alternatively, include a first triangular-shaped lateral portion surface 138 having a forward edge situated adjacent to an outer-end edge of the first lower lateral portion surface 135. The second lateral portion 150 may additionally, or alternatively, include a second triangular-shaped lateral portion surface 158 having a forward edge situated adjacent to an outer-end edge of the second lower lateral portion surface 155.

Figure 4:
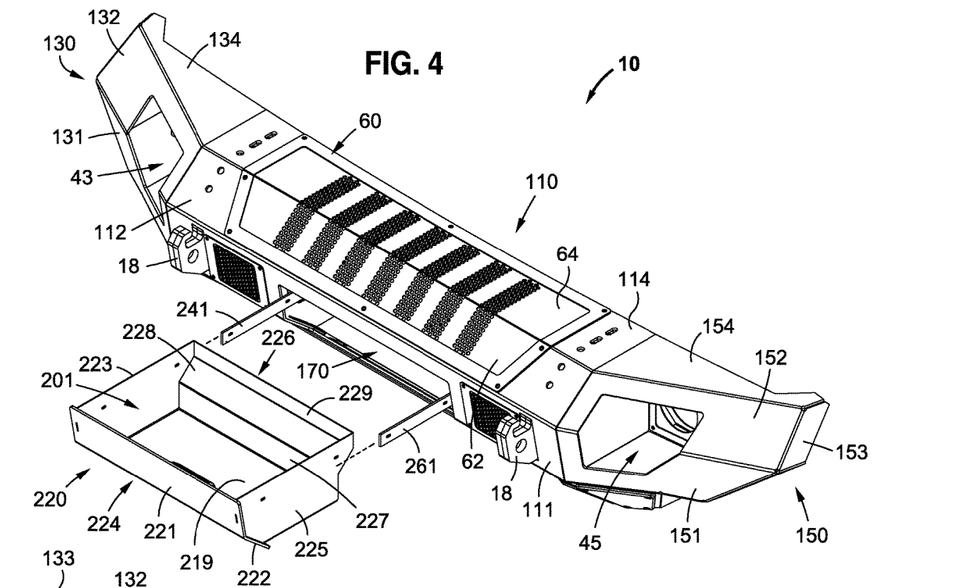
FIG. 4 is a perspective view of the front bumper assembly of FIG. 1, with parts separated, in accordance with an embodiment the present disclosure.

The middle portion 110 of the bumper member 100 includes a receptacle 170 having an outer perimeter 70, e.g., as shown in FIGS. 4 and 5. In the illustrative embodiment shown in FIG. 2, the outer perimeter 70 includes an upper outer perimeter portion 71 defined by the front middle portion surface 111 of the middle portion 110, and a lower outer perimeter portion 72 defined by the second angled middle portion surface 113 of the middle portion 110.

Figure 6:
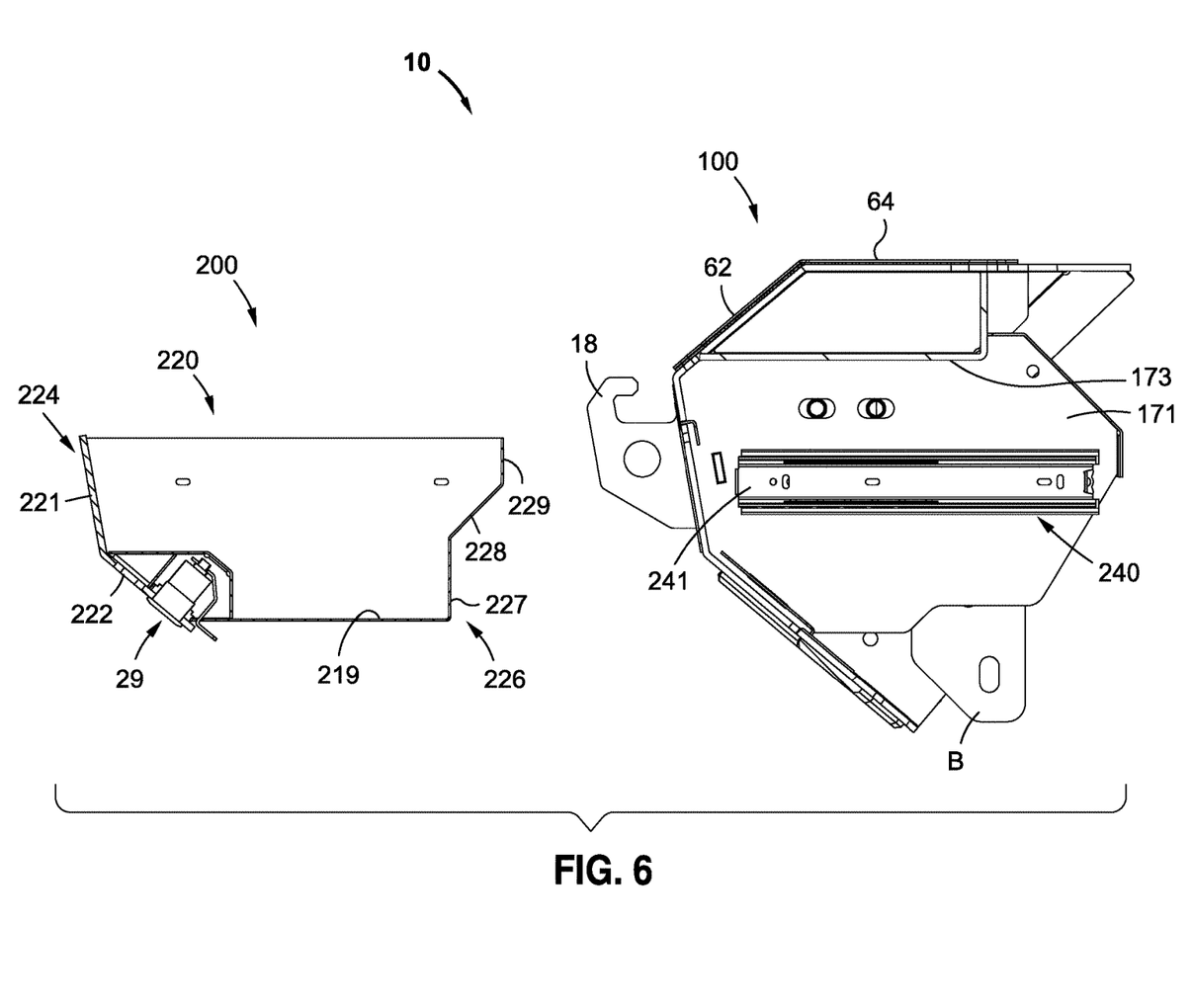
FIG. 6 is a cross-sectional view of the front bumper assembly of FIG. 1, with parts separated, in accordance with an embodiment the present disclosure.

In some embodiments, as shown in FIGS. 5 and 6, the receptacle 170 is defined by a first receptacle side wall 171, a second receptacle side wall 172, and a receptacle top wall 173. A sliding mechanism is operably associated with the storage drawer 200 and supports the storage drawer 200 within the receptacle 170 to allow the storage drawer 200 to be withdrawn from the receptacle 170. The sliding mechanism is preferably similar to a filing cabinet drawer slides that telescope out as the box is telescoped out. In a preferred embodiment, the sliding mechanism includes a first drawer slide 240 associated with the first receptacle side wall 171 and a second drawer slide 260 associated with the second receptacle side wall 172. The first receptacle side wall 171 may be provided with a channel (not shown) for receiving the first drawer slide 240 and/or the second receptacle side wall 172 may be provided with a channel (not shown) for receiving the second drawer slide 260 therein.

The first drawer slide 240 and the second drawer slide 260 each include two or more extension rails slideably interfitted within one another, with one of the rails attached to one of the receptacle side walls and one of the rails attached to the storage drawer 200. The first drawer slide 240 (shown in FIG. 6) includes a rail 241 for attachment to the storage drawer 200 and a rail for attachment to the first receptacle side wall 171. The second drawer slide 260 (shown in FIG. 5) includes a rail 261 for attachment to the storage drawer 200 and a rail for attachment to the second receptacle side wall 172. The storage drawer 200 may be attached to the rails 241, 261 in any suitable manner, e.g., bolts, screws, or rivets. The first drawer slide 240 and/or the second drawer slide 260 may include a stop mechanism to stop the closing or opening movement of the rails. The first drawer slide 240 and/or the second drawer slide 260 may include a rubber bumper to absorb heavy impacts from closing the storage drawer 200. High-precision ball bearings, bushings or other similar elements may be located between the rails of the drawer slides to provide smooth and easy extension and retraction of the rails.

The storage drawer 200 includes a bottom wall 219 and a perimeter 220 of walls (and/or wall portions) extending upwardly therefrom and defining a storage compartment 201 therein, e.g., as shown in FIG. 4. The storage drawer 200 can either be an open topped drawer or it can be provided with a cover or lid, e.g., a hinged lid designed to cover and protect the storage compartment 201 and its contents. When provided with a cover or lid (not shown), the items stored in the storage compartment 201 within the storage drawer 200 may be immune to dust, oil, grease, dirt, etc. Those skilled in the art will recognize that the storage compartment 201 may be partitioned into a plurality of storage compartments, one or more of which include a cover or lid.

The storage drawer 200 is aligned with the receptacle 170 of the bumper member 100 and slideably moveable from a closed position, in which the storage compartment 201 is disposed within the receptacle 170, to an open position, in which at least a portion of the storage compartment 201 is disposed outward from the front end of the bumper assembly 10. In a preferred embodiment, the storage drawer 200 is slideably moveable horizontally outward from the front end of the bumper assembly 10. In other embodiments, the storage drawer 200 may be slideably moveable along an inclined plane, e.g., to provide resistance to opening and/or for easy closing.

In an embodiment, the perimeter 220 of the storage drawer 200 includes a front wall 224, a rear wall 226, a first side wall 223, and a second side wall 225. The front wall 224 may include a plurality of wall portions. In a preferred embodiment, the front wall 224 includes a first portion 221 and a second portion 222. The first portion 221 and the second portion 222 of the front wall 224 may be integrally formed as a single unitary body. The rear wall 226 may include a plurality of wall portions. In a preferred embodiment, the rear wall 226 includes a lower rear wall portion 227, an upper rear wall portion 229, and a middle rear wall portion 228 coupled between the lower rear wall portion 227 and the upper rear wall portion 229. The lower rear wall portion 227, the upper rear wall portion 229, and the middle rear wall portion 228 may be integrally formed as a single unitary body.

In some embodiments, when the storage drawer 200 is in a closed position, the first portion 221 of the front wall 224 of the storage drawer 200 is substantially flush with the front middle portion surface 111 of the middle portion 110 of the bumper member 100, and the second portion 222 of the front wall 224 of the storage drawer 200 is substantially flush with the second angled middle portion surface 113 of the bumper member 100, e.g. as shown in FIG. 2. In some embodiments, the second portion 222 of the front wall 224 slants at an angle so as to reduce the profile of the bumper assembly 10, which may reduce the likelihood of damage to the storage compartment 201 and/or to equipment therein.

The storage drawer 200 includes a locking mechanism 29 to provide security for the items contained in the storage compartment 201. The locking mechanism 29 may be a lock-and-key mechanism, a dial combination lock, a keyless lock, a keypad lock, a fingerprint biometric lock, a remote-controlled lock, etc. It is to be understood that the locking mechanism 29 may include any of a variety of hardware components and/or electronic components.

The presently-disclosed bumper assembly 10 is intended to be connectable to the front end of a motor vehicle (e.g., motor vehicle V shown in FIG. 1). It is to be understood that any suitable manner of mounting or fixedly securing the bumper assembly 10 adjacent to the front end of a motor vehicle may be utilized. In an embodiment, as shown for example in FIG. 5, brackets B are attached to each of the first lateral portion 130 and the second lateral portion 150 and extend from the inner side thereof for connection to the frame of a vehicle so that the bumper assembly 10 can be mounted to the vehicle with the middle portion 110 of the bumper member 100 facing away from the front end of the vehicle. The brackets B may be mounted to the frame of a vehicle by means of bolts utilizing bracket holes. Those skilled in the art will recognize that the different chassis or frame construction of different motor vehicles may require some modifications related to the way that the bumper assembly 10 is interconnected with and attached to the vehicle. Such modifications will be readily apparent to those skilled in the art and can be adapted as required without substantially altering the inventive concepts herein disclosed and claimed.

Although embodiments have been described in detail with reference to the accompanying drawings for the purpose of illustration and description, it is to be understood that the disclosed apparatus are not to be construed as limited thereby. It will be apparent to those of ordinary skill in the art that various modifications to the foregoing embodiments may be made without departing from the scope of the disclosure.

What is claimed is:

1. A vehicle front bumper, comprising:
   a bumper member, including:
      a middle portion including a receptacle; and
      at least two lateral portions, wherein the middle portion is coupled between the at least two lateral portions; and
   a lockable drawer slideably coupled to the bumper member, wherein the lockable drawer includes a bottom wall and a perimeter of walls extending upwardly therefrom and defining a storage compartment therein,
   wherein the lockable drawer is slideably moveable from a closed position, in which the storage compartment is disposed within the receptacle, to an open position, in which at least a portion of the storage compartment is disposed outward from a front end of the vehicle front bumper; and
   wherein the lockable drawer is slideably moveable along an inclined plane outward from the front end of the vehicle front bumper.

2. The vehicle front bumper of claim 1, wherein the lockable drawer is slideably moveable horizontally outward from the front end of the vehicle front bumper.

3. The vehicle front bumper of claim 1, wherein the receptacle is defined by a first receptacle side wall and a second receptacle side wall.

4. The vehicle front bumper of claim 3, wherein the receptacle is further defined by a receptacle top wall.

5. The vehicle front bumper of claim 3, wherein the bumper member further includes a first drawer slide associated with the first receptacle side wall.

6. The vehicle front bumper of claim 3, wherein the bumper member further includes a second drawer slide associated with the second receptacle side wall.

7. The vehicle front bumper of claim 1, wherein the at least two lateral portions include a first lateral portion and a second lateral portion disposed at opposite ends of the middle portion of the bumper member.

8. The vehicle front bumper of claim 7, wherein the first lateral portion of the bumper member includes a first upwardly angled lateral portion surface, a first downwardly angled lateral portion surface, and a first top lateral portion surface.

9. The vehicle front bumper of claim 8, wherein an upper edge of the first upwardly angled lateral portion surface is situated adjacent to a forward edge of the first top lateral portion surface, and a lower edge of the first upwardly angled lateral portion surface is situated adjacent to an upper edge of the first downwardly angled lateral portion surface.

10. The vehicle front bumper of claim 8, wherein the first downwardly angled lateral portion surface and the first upwardly angled lateral portion surface are integrally formed as a single unitary body.

11. The vehicle front bumper of claim 6, wherein the first lateral portion of the bumper member includes a first lateral portion recess to house either or both of a lamp and a fixture for the lamp.

12. A vehicle front bumper, comprising:
 a bumper member, including:
  a first portion, wherein the first portion includes a front surface, a first angled surface, and a second angled surface, wherein the front surface is coupled between the first angled surface and the second angled surface; and
  a receptacle having an outer perimeter, wherein the outer perimeter includes an upper outer perimeter portion defined by the front surface of the first portion, and a lower outer perimeter portion defined by the second angled surface of the first portion; and
 a lockable drawer slideably coupled to the bumper member, wherein the lockable drawer is slideably moveable from a closed position, in which the storage compartment is disposed within the receptacle, to an open position, in which at least a portion of the storage compartment is disposed outward from a front end of the vehicle front bumper;
 wherein the bumper member further includes at least two lateral portions, and wherein the first portion of the bumper member is disposed between the at least two lateral portions; and
 wherein the first lateral portion of the bumper member includes a first upwardly angled lateral portion surface, a first downwardly angled lateral portion surface, and a first top lateral portion surface.

13. The vehicle front bumper of claim 12, wherein the lockable drawer is slideably moveable horizontally outward from the front end of the vehicle front bumper.

14. The vehicle front bumper of claim 12, wherein the lockable drawer includes a bottom wall and a perimeter of walls extending upwardly therefrom and defining at least one storage compartment therein.

15. The vehicle front bumper of claim 14, wherein the perimeter of walls extending upwardly from the bottom wall of the lockable drawer includes a front wall, a rear wall, a first side wall, and a second side wall.

16. The vehicle front bumper of claim 15, wherein the bumper member further includes a first drawer slide coupled to the first side wall and a second drawer slide coupled to the second side wall, wherein the first drawer slide and the second drawer slide support the lockable drawer within the receptacle to allow the lockable drawer to be withdrawn from the receptacle.

17. The vehicle front bumper of claim 12, wherein an upper edge of the first upwardly angled lateral portion surface is situated adjacent to a forward edge of the first top lateral portion surface, and a lower edge of the first upwardly angled lateral portion surface is situated adjacent to an upper edge of the first downwardly angled lateral portion surface.

* * * * *